H. A. BLANCHARD.
PIPE JOINT.
APPLICATION FILED OCT. 22, 1918.

1,334,130.

Patented Mar. 16, 1920.

Henry A. Blanchard,
Inventor

By Geo. P. Kimmel
Attorney

UNITED STATES PATENT OFFICE.

HENRY A. BLANCHARD, OF MALONE, NEW YORK.

PIPE-JOINT.

1,334,130.  Specification of Letters Patent.  Patented Mar. 16, 1920.

Application filed October 22, 1918. Serial No. 259,254.

*To all whom it may concern:*

Be it known that I, HENRY A. BLANCHARD, a citizen of the Dominion of Canada, residing at Malone, in the county of Franklin and State of New York, have invented certain new and useful Improvements in Pipe-Joints, of which the following is a specification.

This invention relates to improvements in pipe joints and it is the principal object of the invention to provide an effectual, durable and simple form of joint capable of being used in connection with water, steam or other piping and which because of its arrangement will avoid the use of gaskets or the grinding of joints.

Other objects will be in part obvious and in part pointed out hereinafter.

The improvements in the details and arrangement of parts will be apparent from an inspection of the accompanying drawings when considered in connection with the specific description hereinafter contained and wherein an embodiment of the invention is shown for the purpose of illustration.

Figure 1:
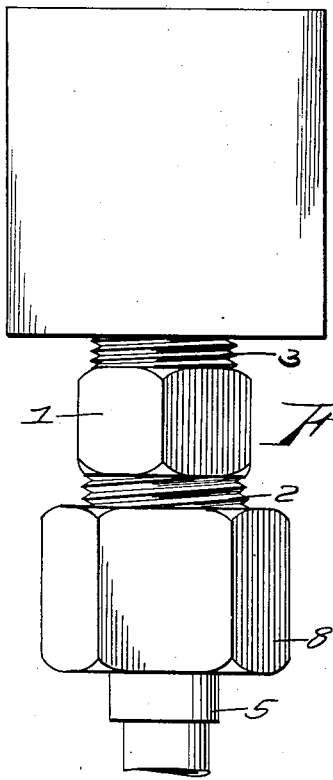
Figure 1 is a side elevation showing the device applied to a form of union.
Figure 2:
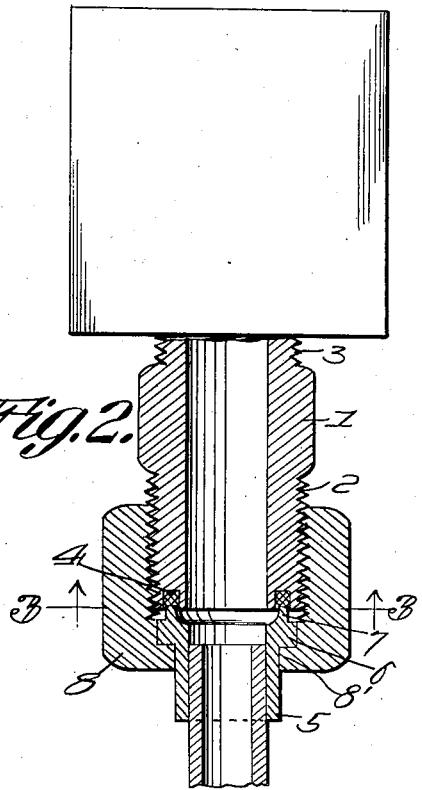
Fig. 2 is a vertical section therethrough.
Figure 3:
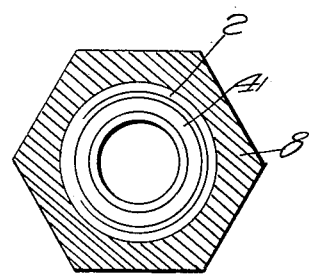
Fig. 3 is a horizontal section taken on the line 3—3 of Fig. 2.
Figure 4:
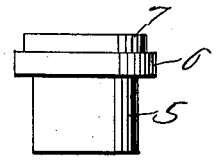
Fig. 4 is a detail in side elevation of a form of sleeve employed.

Having more particular reference to the drawings, in connection with which like reference characters will designate corresponding parts throughout the several views, it is to be noted that I have shown the improved joint in connection with a water glass union, such as commonly employed in connection with liquid gages, such connection embodying a screw threaded pipe section 1, one end of which is reduced as at 2 and screw threaded while the opposite end is reduced as at 3 and is also screw threaded to permit the connection of the ordinary water glass shield therewith. An annular way or groove is formed in the end of the reduced portion 2 of the section and is filled with a soft metal packing 4 such as lead or the like, the upper surface of this packing being flushed with the adjacent surface of the pipe section end.

A sleeve or second pipe section 5 is used in this particular form of connection and has one end thereof formed with an annular flange 6 carrying an annular web 7 adapted to be engaged in the lead packing 4 arranged in the annular groove or way in the adjacent end of the reduced portion 2, of the first pipe section. To effect connection between the sleeve 5 and the first pipe section, an internally screw threaded union 8 is employed and as will be understood is adapted to have the flanged upper portion 8' thereof engaged with the flanged end 6 of the sleeve 5, while the threaded portion thereof is turned onto the screw threaded portion of the enlarged end 5 of the pipe section, thereby moving the adjacent ends of said pipe section and said sleeve into engagement and that, causing the annular web 7 to be engaged in the soft lead packing 4 arranged in the annular groove in the end of the reduced portion 2. Of course, a certain portion of this lead packing will be displaced due to the engagement of the annular web 7 therein and in consequence, will serve to provide a fluid tight connection between the adjacent ends of the first pipe section and the sleeve 5, which connection will successfully withstand either water or steam, irrespective of the pressure under which it is placed.

The sleeve 5, of course, as will be understood, is connected to the ordinary siphon pipe employed in connection with the type of liquid gage above set out, in order that the functioning of said gage will be permitted.

My invention is capable of embodiment in joints of various forms with such changes and alterations as may be desirable to suit different conditions. It provides a positively fluid tight connection between the adjacent ends of pipe sections so connected, as well as a simple but strong and substantial construction which can be easily made at comparatively low cost.

As hereinbefore indicated, I do not wish to be understood as confining the invention to the particular embodiment chosen for illustration herein, nor to the exact arrangement and adaption of parts shown and described, but I reserve the right to make any changes and alterations that fairly fall within the spirit and scope of the invention.

I claim:

The combination of pipe sections, one of said sections having an annular way formed in one of its ends, soft metal seated in and completely filling said way, a sleeve on the other pipe section and having an external rim formed with an annular web to engage with said soft metal in the way, said web being formed with a straight outer periphery, while the inner periphery is curved inwardly and this web being of a depth substantially equal to the depth of the way, and a union fitted to encircle the sleeve and abutting its rim for connecting said sections and maintaining the web in engagement with the soft metal and also to displace the same on movement of the web within the way.

In testimony whereof I affix my signature hereto.

HENRY A. BLANCHARD.